US012272515B2

(12) United States Patent
Carroll et al.

(10) Patent No.: US 12,272,515 B2
(45) Date of Patent: *Apr. 8, 2025

(54) MICROCHANNEL PLATE AND METHOD OF MAKING THE MICROCHANNEL PLATE WITH AN ELECTRON BACKSCATTER LAYER TO AMPLIFY FIRST STRIKE ELECTRONS

(71) Applicant: Elbit Systems of America, LLC, Fort Worth, TX (US)

(72) Inventors: Stephen W. Carroll, Salem, VA (US); Arlynn W. Smith, Blue Ridge, VA (US); Todd A. Smith, Salem, VA (US)

(73) Assignee: Elbit Systems of America, LLC, Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/400,258

(22) Filed: Dec. 29, 2023

(65) Prior Publication Data
US 2024/0136141 A1    Apr. 25, 2024

Related U.S. Application Data

(63) Continuation of application No. 17/706,112, filed on Mar. 28, 2022, now Pat. No. 11,901,151.

(51) Int. Cl.
*H01J 31/50* (2006.01)
*G02B 23/12* (2006.01)
*H01J 9/12* (2006.01)

(52) U.S. Cl.
CPC .......... *H01J 31/507* (2013.01); *G02B 23/12* (2013.01); *H01J 9/125* (2013.01); *H01J 2231/50026* (2013.01); *H01J 2231/50063* (2013.01); *H01J 2231/5016* (2013.01)

(58) Field of Classification Search
CPC ............... H01J 31/507; H01J 9/125; H01J 2231/50026; H01J 2231/50063; H01J 2231/5016; H01J 43/246; G02B 23/12
See application file for complete search history.

(56) References Cited

U.S. PATENT DOCUMENTS 11,901,151 B2 *  2/2024  Carroll ................. H01J 43/246

\* cited by examiner

*Primary Examiner* — Seung C Sohn
(74) *Attorney, Agent, or Firm* — Spencer Fane LLP (57) ABSTRACT

A night vision system along with an image intensifier tube having a microchannel plate and method of forming the microchannel plate are provided. The microchannel plate comprises a plurality of spaced channels extending through the microchannel plate, wherein each channel sidewall surface near the input face of the microchannel plate comprises a series of layers formed thereon. The input face of the microchannel plate, as well as the sidewall surfaces of each channel near the input surfaces, are configured with an electron backscatter layer arranged between a contact metal layer and a secondary electron booster layer. When formed partially into the channel openings near the input face, the electron backscatter layer and overlying secondary electron booster layer are configured circumferentially around the sidewall surfaces and extend radially inward toward a central axis of each channel.

20 Claims, 3 Drawing Sheets

MICROCHANNEL PLATE AND METHOD OF MAKING THE MICROCHANNEL PLATE WITH AN ELECTRON BACKSCATTER LAYER TO AMPLIFY FIRST STRIKE ELECTRONS

PRIORITY CLAIM AND CROSS-REFERENCE TO RELATED APPLICATIONS

The present application is a continuation of U.S. patent application Ser. No. 17/706,112, entitled MICROCHANNEL PLATE AND METHOD OF MAKING THE MICROCHANNEL PLATE WITH AN ELECTRON BACKSCATTER LAYER TO AMPLIFY FIRST STRIKE ELECTRONS and filed Mar. 28, 2022, the contents of which are hereby incorporated by reference in their entirety.

FIELD OF THE INVENTION

Example embodiments in general relate to night vision systems and, more particularly, image intensifier tubes and a method of manufacturing such tubes with an improved microchannel plate (MCP). The MCP is configured with channel openings having an electron backscatter layer formed along the side of each channel opening between a metal contact layer and a secondary electron booster layer to scatter primary electrons onto the booster layer and amplify resulting first strike electrons.

BACKGROUND

Night vision system such as night vision goggles typically include an image intensifier tube. The image intensifier tube, or "image intensifier", can include an electron multiplier arranged between a photocathode and a sensor anode. The photocathode detects light in the form of photons sent through a lens from an object. The photoelectrons, or "electrons", emitted from the photocathode are intensified or amplified. The amplified electrons can be drawn to the anode, where they can be converted back to photons displayed on a screen. The anode or screen can include a sensor that, upon receiving the increased or multiplied number of electrons, senses those electrons and produces an intensified representation of the image on the screen. The photocathode, the electron multiplier, and the anode are typically supported in a vacuum housing with gaps between the photocathode, electron multiplier, and the sensor anode to provide gain and facilitate the flow of electrons therebetween. The night vision system can further include one or more eyepieces arranged on a night vision system, between the screen and the user's eyes.

One type of electron multiplier is a microchannel plate (MCP). The MCP is placed between the photocathode and a phosphor-covered sensor anode. The photocathode produces a pattern of electrons that correspond with the pattern of photons produced from a low-light level image. Through use of electrostatic fields, the pattern of photoelectrons emitted from the photocathode are directed to the surface of the MCP. The MCP input surface, or input face, is substantially planar with openings spaced across the input surface, and each opening extends as micro channels or "channels" that extend from the input surface to an opposed output surface substantially parallel to the input surface. As the incoming electrons from the photocathode strike the inner surface of the channel opening at the input surface, secondary electrons are produced. Accordingly, the MCP emits from its micro channels a proportional number of secondary emission electrons dependent on the primary electrons sent from the photocathode. The secondary emission electrons thereby form an electron shower to amplify the electrons produced by the photocathode in response to the initial low-light level image. The shower of electrons, at an intensity much above that produced by the photocathode, are then directed onto a phosphorescent screen of a phosphor-covered anode. The phosphor layer on the screen produces an image of visible light that replicates the low-light level image as presented on the eyepiece of the night vision system.

The MCP is typically formed from a bundle of very small cylindrical tubes, or glass fibers, which have been fused together into a parallel orientation. The bundle can then be sliced to form the MCP. The glass fibers of the bundle thus have their lengths arranged generally along the thickness of the MCP. An MCP may therefor contain an extremely large number of hollow tubes, or channels, between the input and output faces of the MCP. Each channel can form the electron passageway between the input and output faces of the MCP.

In many instances, each tube is slightly angulated with respect to the normal of the MCP planar input and output faces. For example, the central axis of each channel can be biased at a channel bias angle (CBA) relative to the normal of the MCP input and output planar surfaces and the CBA can be between 5° to possibly 16° from normal. The CBA ensures that electrons which enter the channel normal to the MCP input face will strike a channel wall. The CBA helps keep positive ions generated during the operation of the image intensifier from traveling to the photocathode where they can cause damage. The physical properties of the channel walls or radial sides are such that, generally, a plurality of electrons are emitted each time the sides are contacted by one energetic electron. The material of the channel sidewall surfaces that curve around the central axis of the channel have a high coefficient of secondary electron emission greater than one. Typically, the sidewall surface of the channel is the glass cladding of each glass fiber after the core is removed. The glass sidewall surface itself has a relatively high coefficient of secondary electron emission. The voltage bias across the MCP is arranged such that the electron impacts lead to secondary emission ratio greater than one. A material with a high secondary electron emission coefficient can be deposited onto the glass sidewall surface to yield a secondary emission ratio greater than one.

At the input and output faces of the MCP is a contiguous metal contact. An input metal contact on the input face of the MCP is preferably biased to a different voltage than the output metal contact on the output face of the MCP. The contact metal applied to the input surface face is often referred to as an input electrode, whereas the contact metal applied across the output surface face is often referred to as an output electrode. A portion of the contact metal at the output surface face can penetrate into the MCP channels in order to collimate the output electron beam, and such result is generally known as output endspoiling to increase the resolution capabilities of the proximity output toward a phosphor-covered screen anode. The input and output electrodes are biased to produce an electric field through each channel to draw the secondary electrons produced at input channel openings through the MCP and toward the anode. The electrostatic field allows the secondary electrons to gain energy before the next impact with the MCP channel wall. This energy then allows more secondary electrons to be created when the "parent" electron strikes the wall, and the resulting secondary electrons continue to increase, or cascade, along the length of each channel leading to the cascade effect. The cascaded electrons exit the individual channels of the MCP under the influence of another electrostatic field to further accelerate the multiplied electrons onto the proximally placed phosphor-covered screen anode. The number of electrons emitted from the channel will average with those emitted from the other channels to produce an overall amplification or gain of the MCP.

The electrons which strike the MCP input face at the input face channel openings from the photocathode are referred to as "primary electrons." When the primary electrons strike the MCP for the very first time they create a group of secondary electrons referred to as "first strike electrons." The first strike electrons can contain secondary electrons created at the initial impact of the primary electron, and it can also contain secondary electrons created when the primary electron is backscattered from within the MCP channel sidewalls and exits the sidewall back into the channel. This latter group of first strike electrons may contain the initial primary electron that is now designated as a first strike electron because it may be indistinguishable from the secondary electrons.

The signal to-noise ratio (SNR) is a performance metric for image intensifiers. The greater the SNR of an image intensifier, the greater its low-light sensitivity and performance. The first strike efficiency of the MCP component of the image intensifier helps determine the SNR. As the first strike efficiency is increased, so is the SNR.

A deficiency associated with conventional MCPs is the less than ideal first strike efficiency at the input surface of the MCP. First, there is the impact on the flat area between the channels which is a result of the less than 100% open area ratio (OAR) of the MCP. This loss can only be minimized by increasing the OAR. Second, the channel openings at the input surface of the MCP are typically covered with contact metal needed to generate the electrostatic field. The input contact metal electrode has a poor secondary emission coefficient, or ratio, compared to the MCP material deeper in the channel. Typically, the contact metal extending continuously across the input face and partially into the input channel openings has a secondary emission coefficient less than one. Primary electrons striking the input contact metal suffer a reduction in the resulting first strike efficiency by reducing the number of first strike electrons generated from the input contact metal. To minimize this effect the metal coverage at the input openings is typically minimized as much as possible.

It would be desirable to increase the immediate amplification of the electrons striking the input channel openings, and thus increase the number of first strike electrons early on in each MCP channel. In turn, it would also be desirable to increase the first strike efficiency and the amount of electron gain or amplification of the MCP without adverse effects on the voltage bias efficiency of the contact metal on the input and output plate surfaces extending into the input and output channel openings.

SUMMARY

These and other objectives are achieved by a night vision system having an improved MCP, and further having an improved method of manufacturing the same. Each channel opening, preferably the input channel opening that exists at the input face of the MCP, is either angulated into a funnel shape, or has a straight non-tapered input sidewall surface. The sidewall surface at the input channel opening is advantageously configured so that a greater number of first strike electrons can be produced each time a primary electron strikes a sidewall surface of the present, multi-layered sidewall surface of the input channel opening. Specifically, coating the sidewall surface that receives the primary electrons from the photocathode with multiple layers, one of which is an electron backscatter layer, increases the number of first strike electrons yielded from each channel opening of the MCP.

An increase in first strike electrons increases the first strike efficiency of the MCP, and decreases the number of secondary electrons needed to be produced further down the channel to maintain the gain. The MCP degrades the SNR of an image intensifier from the loss of electrons to the input contact metal electrode (i.e., endspoiling) at the flat area between channels and the area at which the contact metal electrode extends into the channel. The MCP also degrades the SNR from the multiplication statistics as electrons are multiplied through the channel. This degradation of the SNR is the noise figure of the MCP and is defined as ratio of the SNR out of the MCP and the SNR input to the MCP. As the cascade of electrons continue down the channel, the multiplication events increase variation. For a given MCP output flux vs. input flux (i.e., gain), increasing the first strike electrons generated from the primary electrons reduces the noise of the MCP by reducing the variation that increases during the cascade. The more multiplication that occurs early in the channel the less variation that is added from later multiplication events.

The electron backscatter layer is preferably formed over the contact metal to direct or "backscatter" primary electrons that would normally contact the relatively low secondary emission coefficient contact metal. Backscattering the primary electrons from the contact metal to an overlying secondary electron booster layer will therefore increase the first strike electrons in the booster layer rather than decrease the first strike electrons if the electron backscatter layer were not present. It is therefore the successive arrangement of contact metal on the input channel openings sidewall surface and on the input face between input channel openings, followed by an electron backscatter layer on the contact metal layer, and further followed by a secondary electron booster layer on the electron backscatter layer that increases immediate amplification of the backscattered electrons. The successive arrangement produces more immediate production of first strike electrons that increases first strike efficiency, amplification and gain of the MCP.

In accordance with at least one example of the present disclosure, a night vision system is provided. The night vision system can include an image intensifier tube placed between a lens and an eyepiece. The image intensifier tube can include a photocathode, a phosphor covered anode, and a MCP arranged a spaced distance between the photocathode and the phosphor covered anode. The MCP can include a spaced plurality of channel openings. The channel openings on the input face of the MCP are often referred to as the input channel openings. The channel openings on the output face of the MCP can be referred to as output channel openings. The output channel openings extend into the MCP and adjoin collinear with the input channel openings, so that each channel extends entirely through the MCP. Each of the channel openings at the input face of the MCP, sometimes referred to as "channel openings" for brevity, can be configured with an electron backscatter layer configured between a contact metal layer and a secondary electron booster layer. The combination of secondary electron booster layer placed onto an electron backscatter layer placed onto a contact metal layer forms a multilayer arrangement that extends at least partially circumferentially around a sidewall surface of each of the channel openings.

The contact metal is an electrode coupled to a voltage supply to generate an electric field through each of the channel openings from the input face to the output face of the MCP. The electron backscatter layer and the secondary electron booster layer are formed in succession on the input face as well as partially into each channel opening a predetermined distance from the input face. The electron backscatter layer and secondary electron booster layer are formed in succession on the contact metal, or contact metal electrode, and the predetermined distance is approximately greater than the standard one half channel diameter depth of the standard endspoiling material.

In accordance with another example of the present disclosure, a MCP within the image intensifier tube is provided. The MCP preferably comprises a channel having a central axis extending at a CBA relative to an input face of the MCP. A first strike angle (FSA) at which the primary electrons enter the channel openings near the input face is typically perpendicular or normal to the substantially planar input face. The CBA is typically at an acute angle relative to the FSA so the primary electrons can strike a "showered" sidewall surface of each of the channel openings near the input face. A first portion of the channel near the input face, or input channel opening, comprises a glass sidewall surface. The contact metal layer is configured adjacent to and radially inward from the glass sidewall surface. The contact metal layer is thereafter coupled to a bias voltage to generate an electrostatic field for energizing and drawing electrons down each channel. An electron backscatter layer is configured adjacent to and radially inward from the contact metal layer. The electron backscatter layer is configured to receive primary electrons emitted from a photocathode and backscatter those primary electrons in a somewhat opposite angular direction from a surface of the electron backscatter layer. A secondary electron booster layer is configured adjacent to and radially inward from the contact metal layer. The electron backscatter layer is configured to therefore receive primary electrons emitted from a photocathode and backscatter those primary electrons from a surface of the electron backscatter layer. The secondary electron booster layer is configured adjacent to and radially inward from the electron backscatter layer. The electron backscatter layer receives primary electrons emitted from a photocathode and backscatter those primary electrons from a surface of the electron backscatter layer. The secondary electron booster layer receives primary electrons on its surface as well as backscattered primary electrons from the surface of the electron backscatter layer and to multiply the received and backscattered primary electrons.

The electron backscatter layer and the secondary electron booster layer are configured on only the input face of the microchannel plate between openings and on the glass sidewall surface of the spaced channel openings at the input face. Preferably, the electron backscatter layer and the secondary electron booster layer are configured on the contact metal that was previously placed on the input face and partially down the glass sidewall surface of the plurality of spaced input channel openings. Preferably, the electron backscatter layer comprises an element having an atomic mass unit (AMU) greater than 100 grams/mole, and preferably greater than 150 grams/mole. The secondary electron booster layer preferably comprises $Al_2O_3$ or $MgO$ formed or grown to a thickness of approximately 30-50 Angstroms (Å). The secondary electron booster layer can also comprise CsI, or other alkali halide material having a high secondary emission ratio of preferably much greater than 1. The contact metal can comprise multiple layers if, for example, the electron backscatter layer requires an additional layer for reliable adhesion thereto. The contact metal layer or layers preferably comprise Inconel or Nichrome. While contact metal should preferably have good conductive capability, its secondary emission ratio is typically less than 0.8 and, instead of generating secondary electrons, contact metal typically absorbs electrons rather than producing them. Thus, contact metal produces no substantial amount of first strike electrons, or amplification thereof. Accordingly, the contact metal is advantageously covered with an electron backscatter layer that backscatters the primary electron onto the secondary electron booster layer with a high secondary emission ratio much greater than 1.0. The contact metal has minimal backscatter capability since it has an AMU less than 60. If the electron backscatter layer is not present, the contact metal cannot by itself backscatter a sufficient number of primary electrons onto the secondary electron booster layer to increase first strike efficiency.

In accordance with yet another example of the present disclosure, a method is provided for making an MCP. The method includes forming glass cores surrounded by respective glass cladding at a first angle relative to opposing input and output faces of the MCP plate. The glass cores are then etched to remove the cores entirely from the remaining glass cladding leaving a plurality of spaced channels. A contact metal layer is then formed on both opposing input and output faces of the plate and partially into each of the spaced channels. An electron backscatter layer is then formed on the contact metal on the input face, and preferably not on the output face. The electron backscatter layer is formed on the input face and contiguously only partially into each of the spaced channels near only the input face. A secondary electron booster layer is then formed on the electron backscatter layer on the input face and contiguously only partially into each of the spaced channels near the input face. The contact metal is then coupled to a bias voltage to electrostatically draw the first strike electrons from the secondary electron booster layer. A portion of the secondary electrons is produced from primary electrons that are backscattered from the electron backscatter layer. The glass cladding at the boundary between the glass cores and the surrounding glass cladding can be etched prior to etching the glass cores to remove the cores entirely. By etching the glass cladding at the boundary, and subsequently etching the glass cores to remove the cores entirely, produces a funnel shaped opening into each of the channel openings. The electron backscatter layer is preferably formed to a thickness typically greater than but not limited to 30 Å, and more preferably between 30 Å to 50 Å.

In accordance with yet another example of the present disclosure, a night vision system that includes an image intensifier tube. The image intensifier tube includes a photocathode, a phosphor covered anode, and a microchannel plate. The microchannel plate includes a spaced plurality of channel openings with an electron backscatter layer configured between a contact metal layer and secondary electron booster layer circumferentially around a sidewall surface of each of the channel openings. The microchannel plate comprises an input face substantially planar surface spaced from the photocathode and an opposing output face substantially planar surface spaced from the phosphor covered anode. The contact metal is coupled to a voltage supply to generate an electric field through each of the channel openings from the input face to the output face. The contact metal layer, the electron backscatter layer and the secondary electron booster layer are formed in succession on the input face and on the sidewall surface of each of the channel openings. The electron backscatter layer and the secondary electron booster layer are formed in succession on only the input face and on the sidewall surface of each of the channel openings extending into the channel openings a predetermined distance from the input face. The electron backscatter layer and the secondary electron booster layer are formed in succession on the sidewall surface of each of the channel openings with the electron backscatter layer extending into the channel openings a predetermined distance from the input face a distance equal to or less than the secondary electron booster layer. The predetermined distance is approximately one half a diameter of each of the channel openings. The contact metal layer, the electron backscatter layer and the secondary electron booster layer are formed in succession radially inward from the sidewall surface circumferentially around an entirety of the sidewall surface a distance approximately one half the diameter of each of the channel openings along the sidewall surface from an input face of the microchannel plate. The electron backscatter layer comprises an element having an atomic mass unit greater than 100 grams/mole, and more preferably greater than 150 grams/mole.

In accordance with yet another example of the present disclosure, a microchannel plate that includes a channel having a central axis extending at a channel bias angle and a first portion of the channel near the input face. The first portion of the channel near the input face includes a circumferentially extending glass sidewall surface, a contact metal layer coupled to a bias voltage, where the contact metal layer is configured adjacent to and radially inward from the glass sidewall surface, and an electron backscatter layer configured adjacent to and radially inward from the contact metal layer, where the electron backscatter layer is configured to receive primary electrons emitted from a photocathode and backscatter the primary electrons from a surface of the electron backscatter layer. The electron backscatter layer the electron backscatter layer comprises an element having an atomic mass unit greater than 100 grams/mole, and preferably greater than 150 grams/mole. The contact metal layer comprises Inconel or Nichrome. The predetermined distance is greater than one half a diameter of one of the plurality of channels. The electron backscatter layer comprises an element having an atomic mass unit greater than 100 grams/mole, and more preferably greater than 150 grams/mole. The electron backscatter layer comprises a thickness of between 30 Å to 50 Å.

In accordance with yet another example of the present disclosure, a method of making a microchannel plate that includes forming glass cores surrounded by respective glass cladding at a first angle relative to opposing input and output faces of a plate, etching the glass cores to remove the cores entirely from the remaining glass cladding leaving a plurality of spaced channels, forming a contact metal layer on both opposing input and output faces of the plate and partially into each of the spaced channels, and forming an electron backscatter layer on the contact metal on the input face and contiguously only partially into each of the spaced channel near only the input face. The method includes etching the glass cladding at the boundary between the glass cores and the surrounding glass cladding prior to etching the glass cores to remove the cores entirely. Etching the glass cladding at the boundary and subsequently etching the glass cores to remove the cores entirely produces a funnel shaped opening into each of the spaced channels. Forming the electron backscatter layer comprises directionally depositing an element having an atomic mass unit greater than 100 grams/mole, and more preferably greater than 150 grams/mole. Forming the electron backscatter layer to a thickness of between 30 Å to 50 Å.

BRIEF DESCRIPTION OF THE DRAWINGS

Examples of the present disclosure are best understood from the following detailed description when read in connection with the accompanying drawings. According to common practice, the various features of the drawings are not drawn to scale, or are only shown in partial perspective. The dimension of the various embodiments are shown arbitrarily expanded or reduced for clarity. Like numerals are used to represent like elements among the drawings. Included in the drawings are the following features and elements, and reference will now be made to each drawing in which.

DETAILED DESCRIPTION OF EXAMPLE EMBODIMENTS

The following discussion is directed to various example embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

As noted above, the drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., x, y or z direction or central axis of a body, opening, channel, outlet or port), while the terms "radial" and "radially" generally mean perpendicular to the given axis. For instance, an axial distance refers to a distance measured along a central axis, and a radial distance means a distance measured perpendicular to the central axis. Radially opposite can mean on opposite sides of the central axis and in an arcuate pattern only partially around and spaced an axial distance from the central axis.

Figure 1:
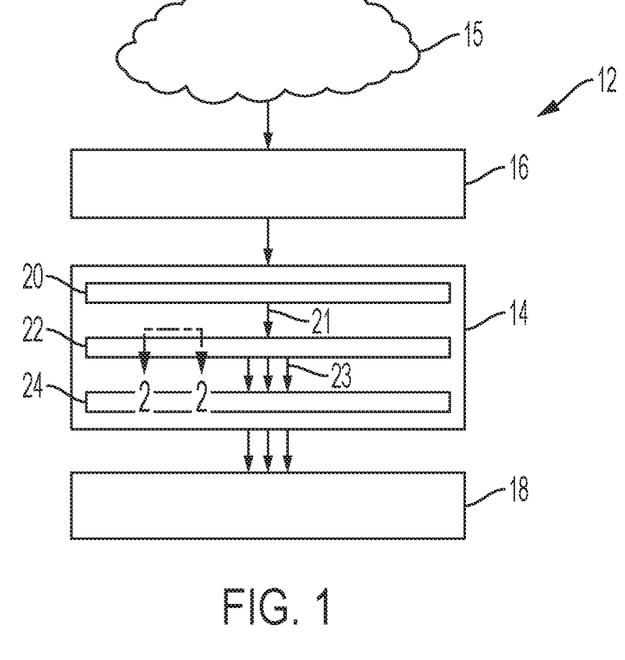
FIG. 1 is a partial block diagram of a night vision system utilizing an image intensifier tube having a MCP.

Referring now to FIG. 1, a partial block diagram of a night vision system 12 is shown. Night vision system 12 comprises an image intensifier tube 14 placed between a pair of lenses 16 and 18. Lens 16 can be a focusing lens that focuses photons from object 15 onto image intensifier 14. Lens 18 can be an eyepiece that directs the outgoing photons produced from image intensifier 14 onto a user's eye. The night vision system 12 can be, for example, goggles, where eyepiece 18 can include two eyepieces.

Image intensifier 14 can be a vacuum tube and is fairly well known, based on Generation-III (GaAs photocathode) or Generation-II (multi-alkali photocathode) image intensifier tube. Within the image intensifier tube 14 is a photocathode 20. Photocathode 20 may comprise a faceplate made of glass and coated with GaAs on a backside surface of the faceplate. Other type III-V materials can be used such as GaP, GaIn, AsP, InAsP, InGaAs, etc. Alternatively, photocathode 20 may be known as Bi-alkali photocathode. Photoemissive semiconductor material of photocathode 20 absorbs photons arriving on a photon receiving face of image intensifier tube 14. Photons absorb by photocathode 20 cause the carrier density of the semiconductor material to increase, thereby causing the material to generate a photocurrent of electrons 21 emitted from the backside electron emission face of photocathode 20.

Photocathode 20, according to one example, converts non-visible or visible low light sources. The non-visible light sources can be near infrared or short wave infrared to visible. An electron multiplier 22 receives electrons 21, and multiplies those electrons to produce multiplied electrons 23. A popular electron multiplier includes a MCP. MCP 22 is typically provided through a plurality of glass fibers, each having a core surrounded by an exterior glass cladding. Each of the plurality of cores can be removed, leaving a spaced plurality of microchannels, or "channels" from the input face to the output face of the MCP. The inside walls or sides of each channel opening has a high electron emissivity coefficient to produce a shower of secondary electrons. The channels are spaced from each other and extend from the input planar surface, or input face, to the output planar surface, or output face, where multiplied electrons are emitted. The secondary emission electrons amplify the electrons produced by the photocathode in response to initial low-light level images. The shower of electrons are produced at an intensity greater than that produced by the photocathode, and therefore the MCP 22 has amplification and gain. Voltage sources can be applied between the various elements of image intensifier 14 to draw electrons from photocathode 20 to MCP 22, through MCP 22, and from the backside emissions surface of MCP 22 onto anode 24. The voltage sources produce an electrostatic field that draws both primary and secondary electrons through image intensifier 14 to impart the desired energy to the multiplied electrons applied to the phosphor covered screen, or anode 24. The phosphor-covered screen converts the multiplied electron pattern initiated from photocathode 20 to a visible light image of the initially received low level image from target 15. The emitted photons are directed by optics, such as a fiber optic bundle of anode 24 from image intensifier 14 onto eyepiece 18. When viewing through eyepiece 18, a user can discern low level visible or non-visible photons reflected or generated from target image 15 through use of the amplified gain and electron multiplication of MCP 22.

Figure 2:
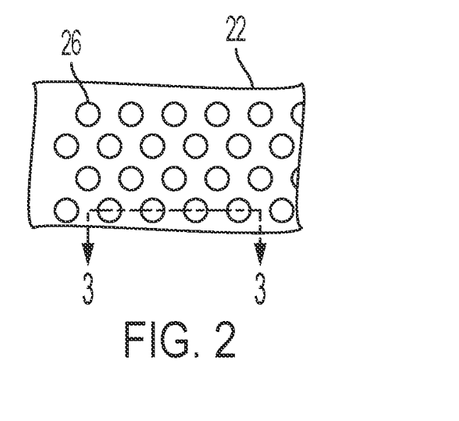
FIG. 2 is a partial top view of a MCP along section 2-2 of FIG. 1.
Figure 3:
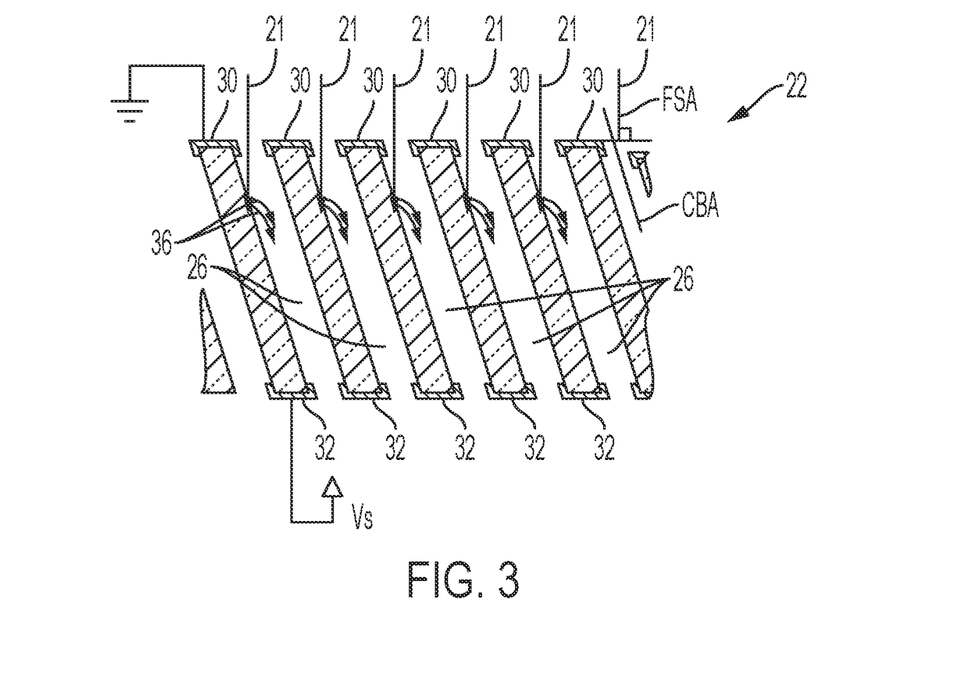
FIG. 3 is a partial cross sectional view along section 3-3 of FIG. 2, showing each channel central axis aligned at a CBA and a FSA at which the primary electrons strike the showered sidewall surface of each channel wall near each channel opening at the input face of the MCP.

Turning now to FIG. 2, a top view is illustrated when viewed from photocathode 20 of MCP 22. Specifically, the top view along section 2-2 of FIG. 1 is illustrated. A plurality of channels extend entirely though MCP 22. Each channel 26 is an opening from the electron input face to the multiplied output face of the MCP 22. Since MCP 22 is shown in FIG. 2 from the photocathode side, the input face is therefore the electron receiving side that receives primary electrons 21 from photocathode 20, as shown in FIG. 1. Each channel 26, along with the input and output openings thereof is preferably the same diameter among channels and openings. In other words, the channel 26 dimensions in FIG. 3 are preferably consistent across MCP 22. The pitch or spacing between channels 26 should also be consistent. It is desirable that the ratio of opening area to the space between openings have an open area ratio (OAR) as high as possible. The channel openings on the input side of the MCP can be funnel shaped to increase the OAR greater than 70% while maintaining proper distances for structural integrity between sidewall surfaces below the funnel opening.

Turning now to FIG. 3, a cross-sectional view of plane 3-3 of FIG. 2 is shown. FIG. 3 illustrates in more detail the plurality of channels 26 within the honeycomb structure of MCP 22. The channels provide a fairly reliable electron multiplier provided the channels 26 are properly slanted or biased at an optimal CBA. An electric field is created between the voltage source Vs supplied to contact metal 30 applied continuously across the input face and contact metal 32 applied continuously across the output face. The channels 26 are the openings that therefore exist between the input and output faces of MCP 22, those channel sidewall surfaces are preferably scrubbed to remove any remaining impurities that could inhibit secondary emissions or produce positive ion bombardment of the photocathode. The electron-accelerating electrostatic fields through each channel 26 occur by applying contact metal on the input and output faces and biasing the contact metal with the voltage supply Vs, wherein the contact metal can include a good conductive material such as Inconel or Nichrome. Contact metal 30 and 32 can extend partially into the channel. The slant angle, or CBA, is taken along the central axis of the channels 26 and is substantially identical across each channel 26 since the channels are parallel to one another. The CBA can be between 5° and 16° relative to the normal of the microchannel plate planar input face.

The electrons 21 sent from photocathode 20 (FIG. 1) strike a visible side of each channel 26 at a first strike angle (FSA). The visible side is the sidewall surface of each channel that can be seen at a line of site normal to the input face of the MCP. That normal line of site is the FSA noted in FIG. 3. The electrons sent from photocathode 20 are henceforth the primary electrons 21 directed along FSA that strike or "shower" the visible side, which can also be referred to as showered side. The side of the channel substantially opposite the visible, or showered, side of the channel is referred to as the shadowed side where primary electrons generally do not strike. Since secondary electrons are generated from the first strike of primary electrons 21, the secondary electrons resulting from the first strike are henceforth first strike electrons. The first strike electrons are only those produced from the primary electrons strike. The first strike electrons include both secondary electrons as well as possibly the primary electron. Subsequent strikes created from the produced secondary electrons further down each channel are sometimes referred to as secondary electron strikes (or sometimes referred to as tertiary electron strikes, etc.) but are not first strike electrons. The secondary electrons, either from the first strike electrons or from subsequently created secondary strike electrons, are electrostatically biased down each channel 26 where even further secondary strikes (or sometimes referred to as tertiary, quaternary, etc. strikes) occur on the opposing radial surfaces of those channels to further increase the cascading or multiplying effect. While multiple strikes can occur from the input surface to the output surface of each channel, and multiplied electrons with gain can result, the very first strike of only the primary electron 21 produces the first strike electrons 36, for brevity in illustration, produced from only one channel. It is understood that each channel produces first strike electrons 36 from the first strike of primary electrons 21 at a first strike angle FSA relative to the channel bias angle. The FSA is normal to the input face of the MCP 22. The FSA, while normal to the input face of MCP 22, is at an acute angle relative to CBA. CBA is preferably between 5° and 16°, and more preferably between 5° and 8° relative to normal, or FSA.

The overall electron multiplication/amplification, or gain, of MCP is in large part dependent on the mean number of electrons produced in response to an input event. Those electrons produced in response to an input event, or first strike electrons 36 produced in response to a primary electron 21 input event, will have significant impact on the overall performance of the MCP 22. As will be noted below in reference to FIG. 4, one way to increase the production of first strike electrons 36 is to apply secondary electron booster material with a high secondary emission coefficient, or ratio, to the input side of the electron receiving face to coat the inside channel walls down along the channel to a predetermined depth. Such booster material may be $Al_2O_3$, MgO, CsI or other alkali material, or any other material or materials in which there is compatibility with the processing equipment and other materials used to manufacture the plate and the channels of MCP 22.

Figure 4:
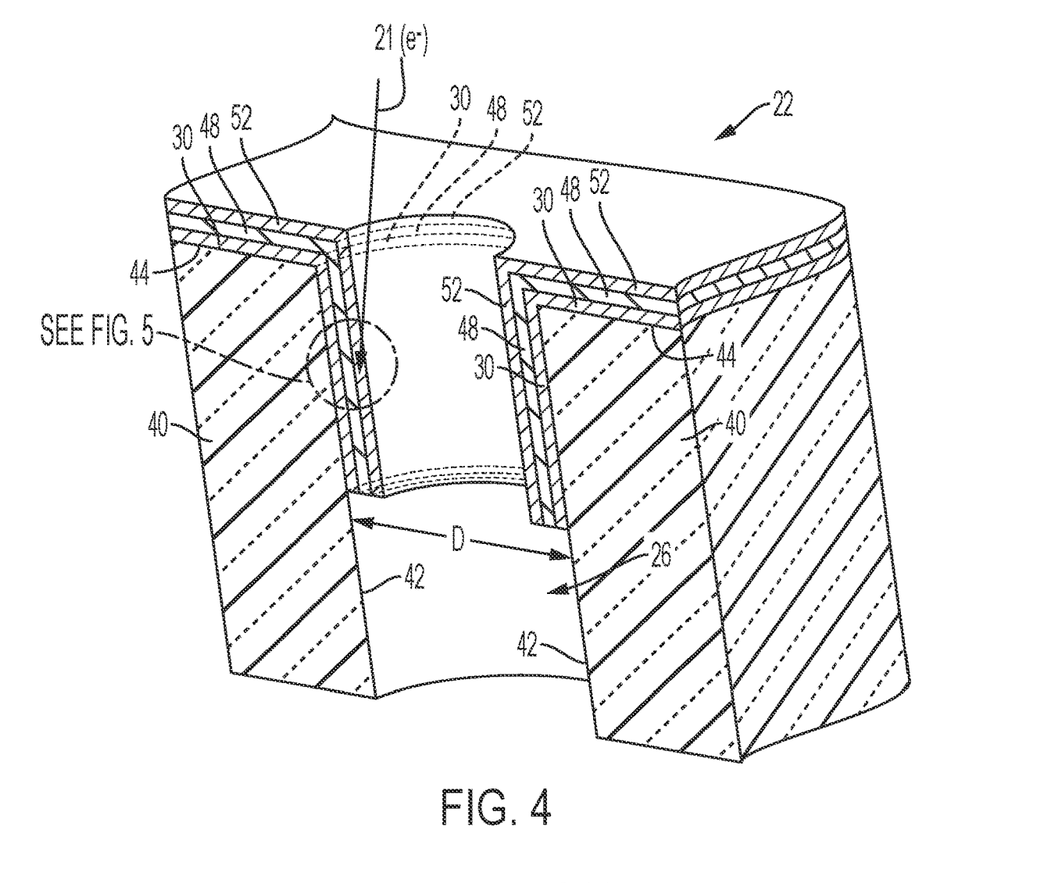
FIG. 4 is a partial cross sectional view of a single channel opening at the input face of the MCP having an electron backscatter layer arranged between a contact metal layer and a secondary electron booster layer.

Turning now to FIG. 4, a partial cross sectional view of a single channel 26 is shown. The single channel 26, like all the other channels 26 within an MCP, comprise a glass cladding 40 having a sidewall surface 42. The glass cladding 40 has an input surface 44 at the input face of the MCP 22. The sidewall surfaces 42 and the input surfaces 44 are therefore made of glass material with a relatively high secondary emission ratio much greater than 1.0. The sidewall and input surfaces 42 and 44 can be prepared not only to remove any impurities from those glass surfaces but also to provide good adhesion for a contact metal 30 placed on the input face of MCP 22 as well as partially into each channel 26 along sidewall surfaces 42. Contact metal 30 is deposited in a continuous, contiguous fashion on the surfaces 42 and 44, but only partially into channel 26 along surface 42.

Contact metal 30 is preferably deposited ½ D, where is D is the diameter of channel 26. However, it is understood that for zero endspoiling the deposition distance can be less than ½ D, but for enhanced adhesion of the contact metal the deposition distance along the sidewall surface can be slightly greater than ½ D. As noted in FIG. 4, the dimensions are not to scale and are modified to more clearly show certain features such as the multi-layer features and the depths of their formation. As noted above, the contact metal 30 is made of a good conductive material, such as a Inconel or Nichrome. Contact metal 30 is deposited to a thickness of approximately 1500 to 2500 Å on sidewall surfaces 42 and input face surfaces 44. Contact metal 30 can be a single layer or multiple layers, and the effective depth of deposition into channel 26 along sidewall surfaces 42 is a function of the geometry of the channel plate as well as the angle of evaporation at which the evaporation tool applies contact metal 30 onto the sidewall surfaces 42. The angle of evaporation is the angular displacement of the evaporation source used to apply contact metal 30 from the plate access or the channel 26 long axis, or central axis, as measured at the channel input openings. The angle of evaporation, in combination with the geometry of the MCP and the evaporation source distanced from the MCP produces the desired depth of coverage down each channel along the sidewall surfaces 42. The angle of evaporation can vary and is preferably parallel to the CBA, or at a more acute angle than CBA. According to one example of deposition, the MCP 22 or the evaporation source (not shown) can be rotated, or rotated along a circumferentially variable angle relative to the normal of the input face. It is therefore necessary to coat the surfaces 42 and 44 of the glass with the contact metal 30 using various coating or evaporation methodologies, including directional deposition methodologies coupled with rotational or variable angulation of the deposition source and/or the MCP 22. It is preferred that the coating along the sidewall surfaces 42 may extend more than a ½ diameter D into channel 26.

An electron backscatter layer 48 is placed on and completely over contact metal 30. By covering the entire contact metal 30, any primary electrons that impinge on the input face, or the sidewall surfaces of channel openings, having contact metal 30 will be directed away from contact metal 30. The primary electrons are directed by electron backscatter layer 48 so as not to deleteriously affect the primary electron absorption that would normally take place in contact metal 30. While contact metal 30 is a fairly good conductor, it is a relatively poor material for secondary electron emissivity. In some cases, but by no means all, only a single secondary electron may be ejected from contact metal layer 30 thereby producing no amplification or multiplication of the initial electron strike, or primary electron strike.

The electron backscatter layer 48 is made of a material or element having a high atomic mass unit (AMU). Preferably, the AMU of electron backscatter layer 48 is greater than 100 grams/mole, and more preferably greater than 150 grams/mole. A preferred element used in electron backscatter layer 48 is gold, having an AMU of approximately 196. Electron backscatter layer 48 is preferably deposited, evaporated, or generally formed to a thickness dependent on the accelerating voltage and is typically, but not limited to, thickness between 30 Å to 50 Å. Although electron backscatter layer 48 is conductive like contact metal 30, the similarities stop at conductivity. Unlike the electron absorption feature of contact metal 30, electron backscatter layer 48 necessarily does not absorb electrons but instead reflects those electrons or backscatters the electrons away from contact metal 30. Backscattering electrons from electron backscatter later 48 necessarily then implies that these backscattered electrons will make a second pass through the secondary electron booster layer 52.

Secondary electron booster layer 52 is deposited upon, adjacent to, and entirely over electron backscatter layer 48. Similar to electron backscatter layer 48, secondary electron booster layer 52 can be deposited or formed using similar formation tools and techniques used in forming the previous layers. The secondary electron booster layer 52, similar to the previous layers, can consist of multiple layers formed to a thickness of approximately 30 to 50 Angstroms of a high secondary emission material such as $Al_2O_3$ or MgO. Alternatively, secondary electron booster layer or layers 52 can consist of CsI along with other alkali halide materials.

While the sidewall surfaces 42 of glass cladding 40 has a secondary emission ratio that can exceed 1.0, the secondary electron booster layer 52 can have a higher secondary emission coefficient, or ratio, than the glass cladding surface. For example, secondary electron booster layer 52 can have a secondary emission ratio between 2.0 and 10.0. Accordingly, regardless of the secondary emission coefficient or ratio, secondary electron booster layer 52 preferably has a higher secondary emissivity than then glass cladding itself.

Figure 5:
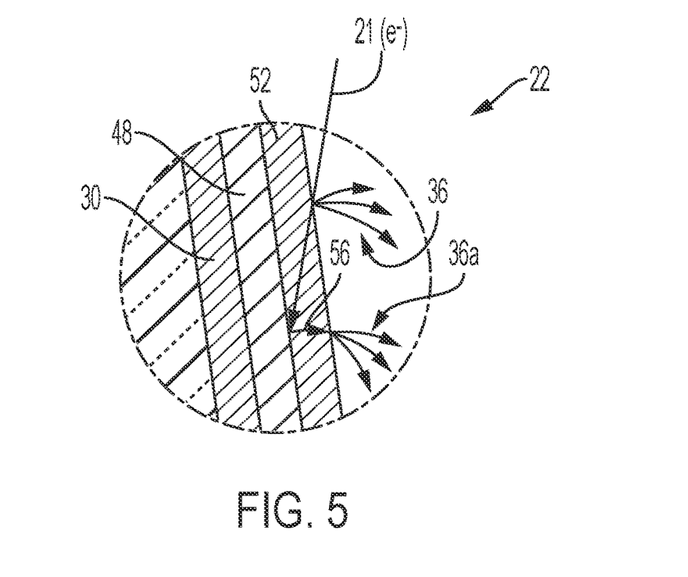
FIG. 5 is an expanded cross sectional view along region 5 of FIG. 4 showing amplified first strike electrons generated from primary electrons striking the secondary electron booster layer from primary electrons backscattered from the electron backscatter layer.

Turning now to FIG. 5, an expanded cross-sectional view along region 5 of FIG. 4 is shown. In particular, FIG. 5 illustrates the functionality of electron backscatter layer 48 placed between contact metal 30 and secondary electron booster layer 52. Primary electron 21 is shown striking the surface of secondary electron booster layer 52, and correspondingly emitting first strike electrons 36 therefrom. A percentage of the primary electrons 21 will penetrate the secondary electron booster layer 52, generating backscattered electrons 56 off electron backscatter layer 48. Thus, rather than being absorbed into contact metal 30, where subsequent first strike electrons cannot be produced therefrom, the backscattered electrons 56 reflect or backscatter from the intermediately placed electron backscatter layer 48. Backscattered electrons will then generate additional secondary electrons as they exit the secondary electron booster layer 52. The additional secondary electrons are therefore additional first strike electrons 36a that, when added to the non-backscattered previous first strike electrons 36, cumulatively add to the total number of first strike electrons. An increase of the first strike efficiency of the MCP 22 results. Increasing the number of first strike electrons provide an MCP first strike amplifier resulting in an improved performance yield of the MCP 22.

Figure 6:
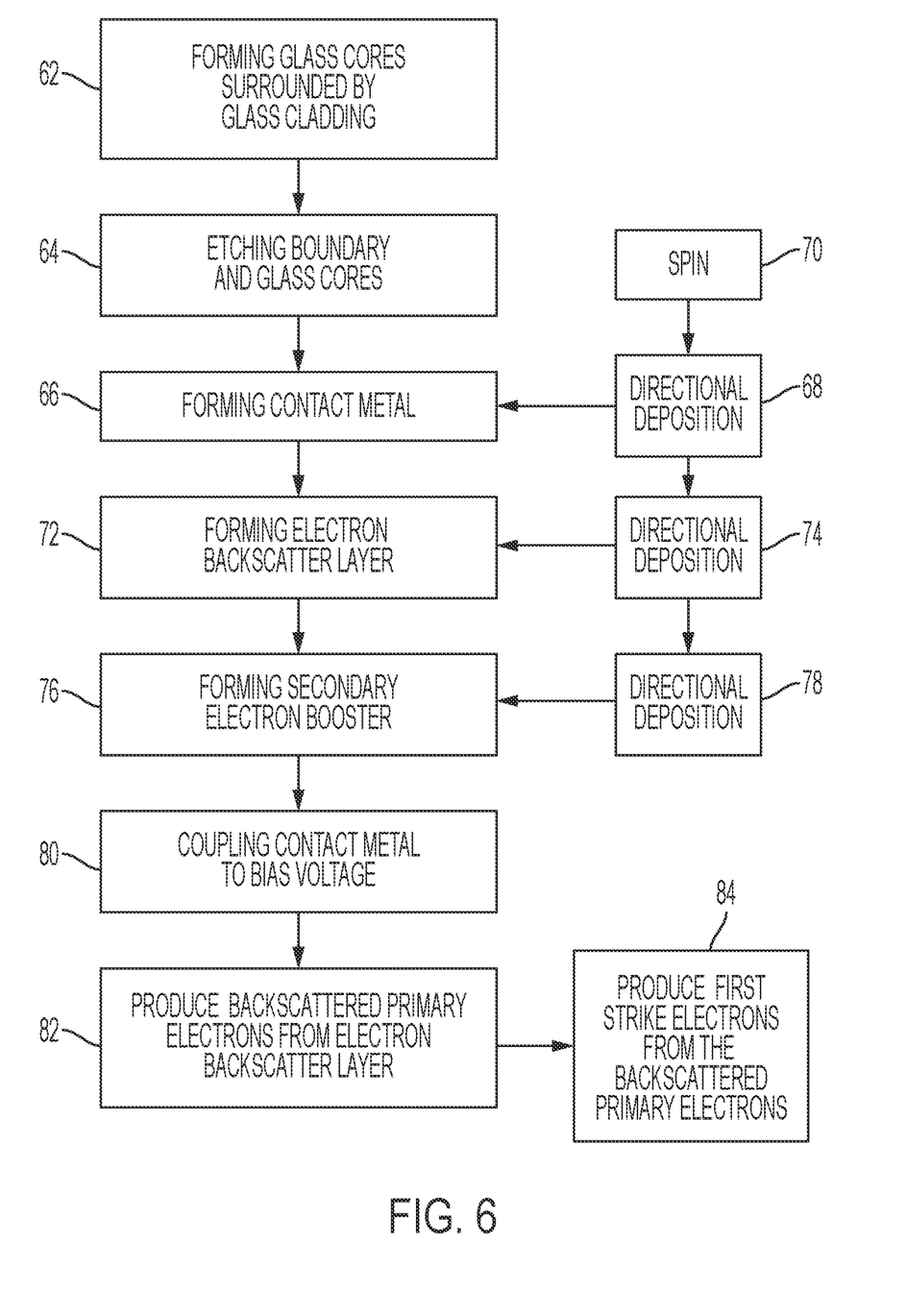
FIG. 6 is a flow diagram of a method for forming a MCP having channel openings with an electron backscatter layer formed between a contact metal layer and a secondary electron booster layer along a sidewall surface of each channel opening to produce backscattered primary electrons as well as and first strike electrons from the backscattered primary electrons.

Turning now to FIG. 6, a method is shown for forming an MCP having channel openings with an electron backscatter layer formed between a contact metal layer and a secondary electron booster layer along a sidewall surface of each channel opening. The method begins by forming a plurality of glass cores each surrounded by glass cladding 62. Next the glass cores are removed using an etchant selective to the core material 64. Alternatively, in step 64 a selective etch can be used to form funnel shapes at the input and output faces of the channel. Regardless of whether the resulting channel opening is a funnel shape or not, a plurality of microchannels or channels are formed entirely through the MCP at the culmination of steps 62 and 64.

Once the channels are formed, contact metal is deposited on the input face of the MCP and partially within each channel along a sidewall surface of each channel 66. The process of forming the contact metal can involve directional deposition or evaporation, or other techniques in which the contact metal is continuously and contiguously placed across the entire input face as well as partially into each channel sidewall surface. If the contact metal is optimally placed, there can exist no input endspoiling. That formation process can involve directional deposition 68 as well as a spin 70 of the deposition tool or MCP. Alternatively, a rotating planetary deposition system can be used with satellite heads on which one or more MCPs are placed at an angle to the source evaporation tool to deposit the material to the desired depth as the head experiences a full rotation.

Next, the electron backscatter layer is formed adjacent to, on, and entirely over the contact metal previously placed at step 72. The electron backscatter layer can be formed by directional deposition and spin techniques 74 and 70, respectively. Alternately, the directional deposition 74 can be an addition to, or the same as, the directional deposition 68 used in forming contact metal 66. Thereafter, the secondary electron booster layer 76 is formed. Similar to the electron backscatter layer and the contact metal layer, secondary electron booster layer is formed on the input face and contiguously only partially into each of the spaced channels near only the input face. The secondary electron booster layer can be formed only partially into each channel, but can also be formed to cover as much as the entire channel circumference lengthwise along the channel sidewall surface. Likewise, the secondary electron booster layer can be deposited directionally 78, and the MCP and/or the deposition tool can be spun during deposition 70.

Once the layers are formed in succession and on top of one another on the input face between channels as well as partially into the sidewall surfaces of each channel, the contact metal is coupled to a bias voltage 80. It is noted that only two layers, the backscatter and electron booster layers, can be used if the backscatter layer can adhere well to the underlying glass cladding and serve as the contact metal. The contact metal layer is typically used as an adhesion layer having good conductivity. If the electron backscatter layer were to have good adhesion properties and is conductive with a high AMU, then the contact metal layer can be eliminated and the deposition step involving contact metal can be eliminated. This would leave only two layers, with the contact metal layer eliminated entirely. The bias voltage draws first strike electrons from the secondary electron booster layer as well as a portion of which are produced from primary electrons backscattering from the electron backscatter layer 82 and 84.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

As used herein, the terms "about," "approximately," "substantially," "generally," and the like mean plus or minus 10% of the stated value or range. In addition, as used herein, the singular forms "a," "an" and "the" are intended to include the plural forms as well, unless the context clearly indicates otherwise. The term "and/or" includes any and all combinations of one or more of the associated listed items. For example, reference to "a feature" includes a plurality of such "features." The term "and/or" used in the context of "X and/or Y" should be interpreted as "X," or "Y," or "X and Y".

The illustrated embodiments described in the detailed description, drawings, and claims are not meant to be limiting. Other embodiments may be used, and other changes may be made, without departing from the spirit or scope of the subject matter presented herein. Additionally, particular aspects of each embodiment may also be used in conjunction with other embodiments of the present disclosure and thus, the disclosed embodiments may be combined as understood in the art. It will be readily understood that the aspects of the present disclosure, as generally described herein, and illustrated in the figures, can be arranged, substituted, combined, separated, and designed in a wide variety of different configurations, all of which are explicitly contemplated herein.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples). Further, as utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the invention as recited in the appended claims. The term "approximately" when used with respect to values means plus or minus five percent of the associated value.

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims.

Without further elaboration, it is believed that one skilled in the art can use the preceding description to utilize the claimed inventions to their fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles discussed. In other words, various modifications and improvements of the embodiments specifically disclosed in the description above are within the scope of the appended claims. For example, any suitable combination of features of the various embodiments described is contemplated.

What is claimed is:

1. A night vision system, comprising:
an image intensifier tube, wherein the image intensifier tube comprises:
a photocathode;
a phosphor covered anode;
a microchannel plate, wherein the microchannel plate comprises a spaced plurality of channel openings with an electron backscatter layer configured between a contact metal layer and secondary electron booster layer circumferentially around a sidewall surface of each of the channel openings.

2. The night vision system of claim 1, wherein the microchannel plate comprises an input face substantially planar surface spaced from the photocathode and an opposing output face substantially planar surface spaced from the phosphor covered anode.

3. The night vision system of claim 2, wherein the contact metal is coupled to a voltage supply to generate an electric field through each of the channel openings from the input face to the output face.

4. The night vision system of claim 2, wherein the contact metal layer, the electron backscatter layer and the secondary electron booster layer are formed in succession on the input face and on the sidewall surface of each of the channel openings.

5. The night vision system of claim 2, wherein the electron backscatter layer and the secondary electron booster layer are formed in succession on only the input face and on the sidewall surface of each of the channel openings extending into the channel openings a predetermined distance from the input face.

6. The night vision system of claim 2, wherein the electron backscatter layer and the secondary electron booster layer are formed in succession on the sidewall surface of each of the channel openings with the electron backscatter layer extending into the channel openings a predetermined distance from the input face a distance equal to or less than the secondary electron booster layer.

7. The night vision system of claim 5, wherein the predetermined distance is approximately one half a diameter of each of the channel openings.

8. The night vision system of claim 1, wherein the contact metal layer, the electron backscatter layer and the secondary electron booster layer are formed in succession radially inward from the sidewall surface circumferentially around an entirety of the sidewall surface a distance approximately one half the diameter of each of the channel openings along the sidewall surface from an input face of the microchannel plate.

9. The night vision system of claim 1, wherein the electron backscatter layer comprises an element having an atomic mass unit greater than 100 grams/mole, and more preferably greater than 150 grams/mole.

10. The microchannel plate of claim 1, wherein the electron backscatter layer comprises an element having an atomic mass unit greater than 100 grams/mole, and more preferably greater than 150 grams/mole.

11. The microchannel plate of claim 1, wherein the electron backscatter layer comprises a thickness of between 30 Å to 50 Å.

12. A microchannel plate comprising:
a channel having a central axis extending at a channel bias angle; and
a first portion of the channel near the input face comprising:
a circumferentially extending glass sidewall surface;
a contact metal layer coupled to a bias voltage, wherein the contact metal layer is configured adjacent to and radially inward from the glass sidewall surface; and
an electron backscatter layer configured adjacent to and radially inward from the contact metal layer, wherein the electron backscatter layer is configured to receive primary electrons emitted from a photocathode and backscatter the primary electrons from a surface of the electron backscatter layer.

13. The microchannel plate of claim 12, wherein the electron backscatter layer the electron backscatter layer comprises an element having an atomic mass unit greater than 100 grams/mole, and preferably greater than 150 grams/mole.

14. The microchannel plate of claim 12, wherein the contact metal layer comprises Inconel or Nichrome.

15. The microchannel plate of claim 12, wherein the predetermined distance is greater than one half a diameter of one of the plurality of channels.

16. A method of making a microchannel plate, comprising:
forming glass cores surrounded by respective glass cladding at a first angle relative to opposing input and output faces of a plate;
etching the glass cores to remove the cores entirely from the remaining glass cladding leaving a plurality of spaced channels;
forming a contact metal layer on both opposing input and output faces of the plate and partially into each of the spaced channels; and
forming an electron backscatter layer on the contact metal on the input face and contiguously only partially into each of the spaced channel near only the input face.

17. The method of claim 16, further comprises etching the glass cladding at the boundary between the glass cores and the surrounding glass cladding prior to etching the glass cores to remove the cores entirely.

18. The method of claim 17, wherein etching the glass cladding at the boundary and subsequently etching the glass cores to remove the cores entirely produces a funnel shaped opening into each of the spaced channels.

19. The method of claim 16, wherein forming the electron backscatter layer comprises directionally depositing an element having an atomic mass unit greater than 100 grams/mole, and more preferably greater than 150 grams/mole.

20. The method of claim 16, wherein forming the electron backscatter layer to a thickness of between 30 Å to 50 Å.

* * * * *